United States Patent
Massicotte et al.

(10) Patent No.: US 11,549,372 B1
(45) Date of Patent: Jan. 10, 2023

(54) ROTOR LOADING SYSTEM

(71) Applicant: PRATT & WHITNEY CANADA CORP., Longueuil (CA)

(72) Inventors: Francois G. Massicotte, Laval (CA); Maxime Desgagne, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/647,897

(22) Filed: Jan. 13, 2022

(51) Int. Cl.
*F01D 5/00* (2006.01)
*B23P 15/04* (2006.01)

(52) U.S. Cl.
CPC ............. *F01D 5/005* (2013.01); *B23P 15/04* (2013.01); *F05D 2220/323* (2013.01)

(58) Field of Classification Search
CPC .. F01D 5/005; B23P 2700/13; F16C 2229/00; Y10T 29/49318; Y10T 29/49323; Y10T 29/49696; Y10T 29/49698; Y10T 29/497
See application file for complete search history.

(56) References Cited

U.S. PATENT DOCUMENTS

| | | | |
|---|---|---|---|
| 3,537,163 A * | 11/1970 | Steidl | F16C 23/045 29/898.07 |
| 5,421,088 A * | 6/1995 | Kawamura | F16C 43/06 384/450 |
| 6,868,609 B1 * | 3/2005 | Nahrwold | F16C 25/06 29/445 |
| 6,951,146 B1 * | 10/2005 | Nahrwold | F16C 19/548 73/862.49 |
| 8,683,670 B2 | 4/2014 | Thomas | |
| 8,713,800 B2 * | 5/2014 | Friedl | F16C 43/06 29/898.07 |
| 9,970,324 B2 | 5/2018 | Tailpied et al. | |
| 11,346,399 B2 * | 5/2022 | Edelmann | F16C 33/4676 |
| 2010/0199755 A1 * | 8/2010 | Mainville | G01M 15/02 73/116.03 |
| 2012/0151735 A1 * | 6/2012 | Thomas | B25B 27/062 29/283 |

* cited by examiner

*Primary Examiner* — Jason L Vaughan
(74) *Attorney, Agent, or Firm* — Norton Rose Fulbright Canada LLP

(57) ABSTRACT

A rotor loading system for an aircraft turbine engine has a first tool having first proximal and first distal ends. The first proximal end defines a traction interface about a first axis and a first surface radially outward of the traction interface. The first distal end defines first projections spaced circumferentially and extending to outward of the first surface. The system has a second tool with second proximal and second distal ends. The second proximal end defines a torque interface about a second axis and a second surface radially outward of the torque interface. The second distal end defines second projections spaced circumferentially and extending to outward of the second surface. One of the first and the second tool is received by the other one of the tools such that: the first and the second axis are colinear and each of the first projections is received between two second projections.

20 Claims, 8 Drawing Sheets

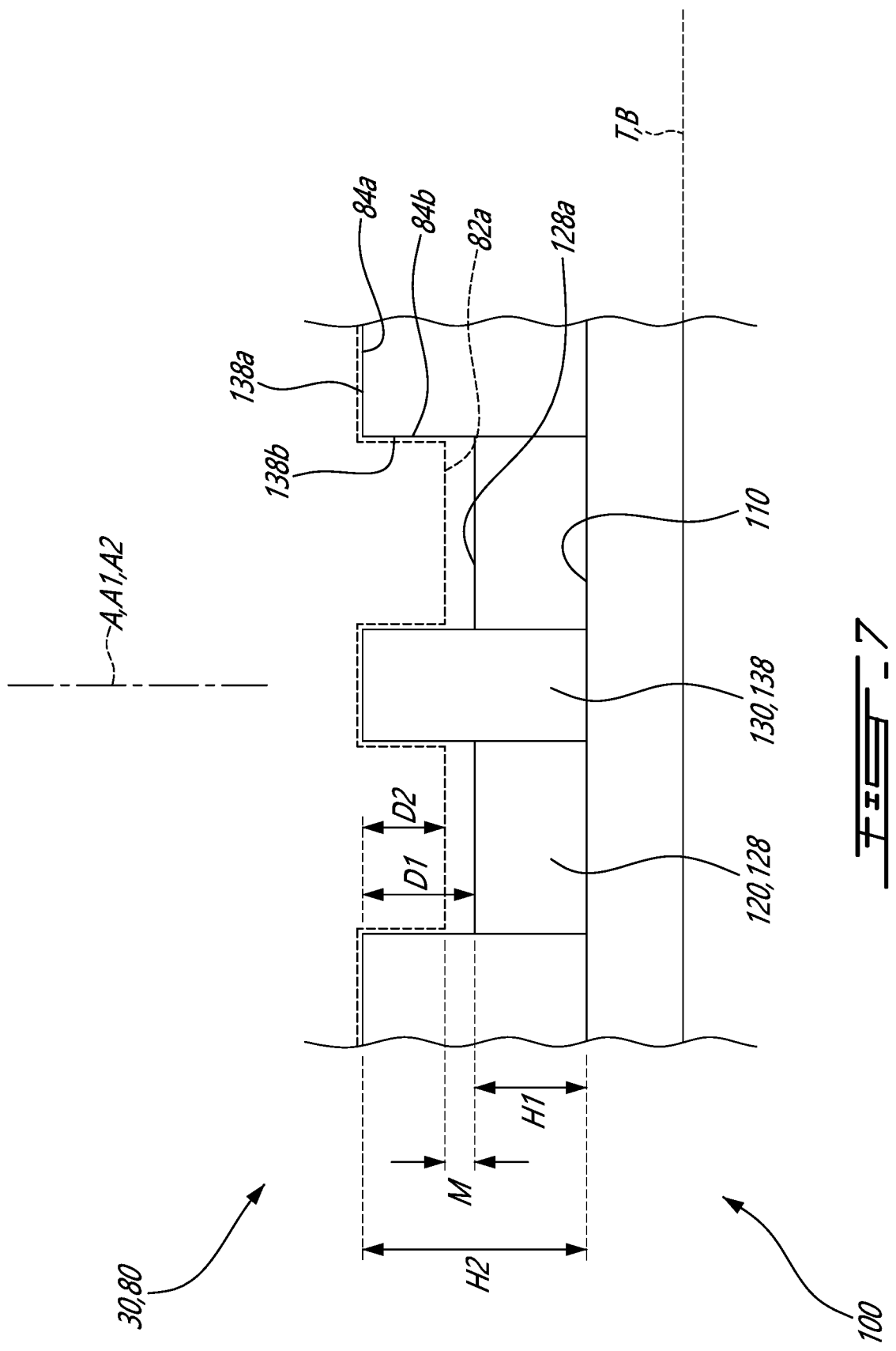

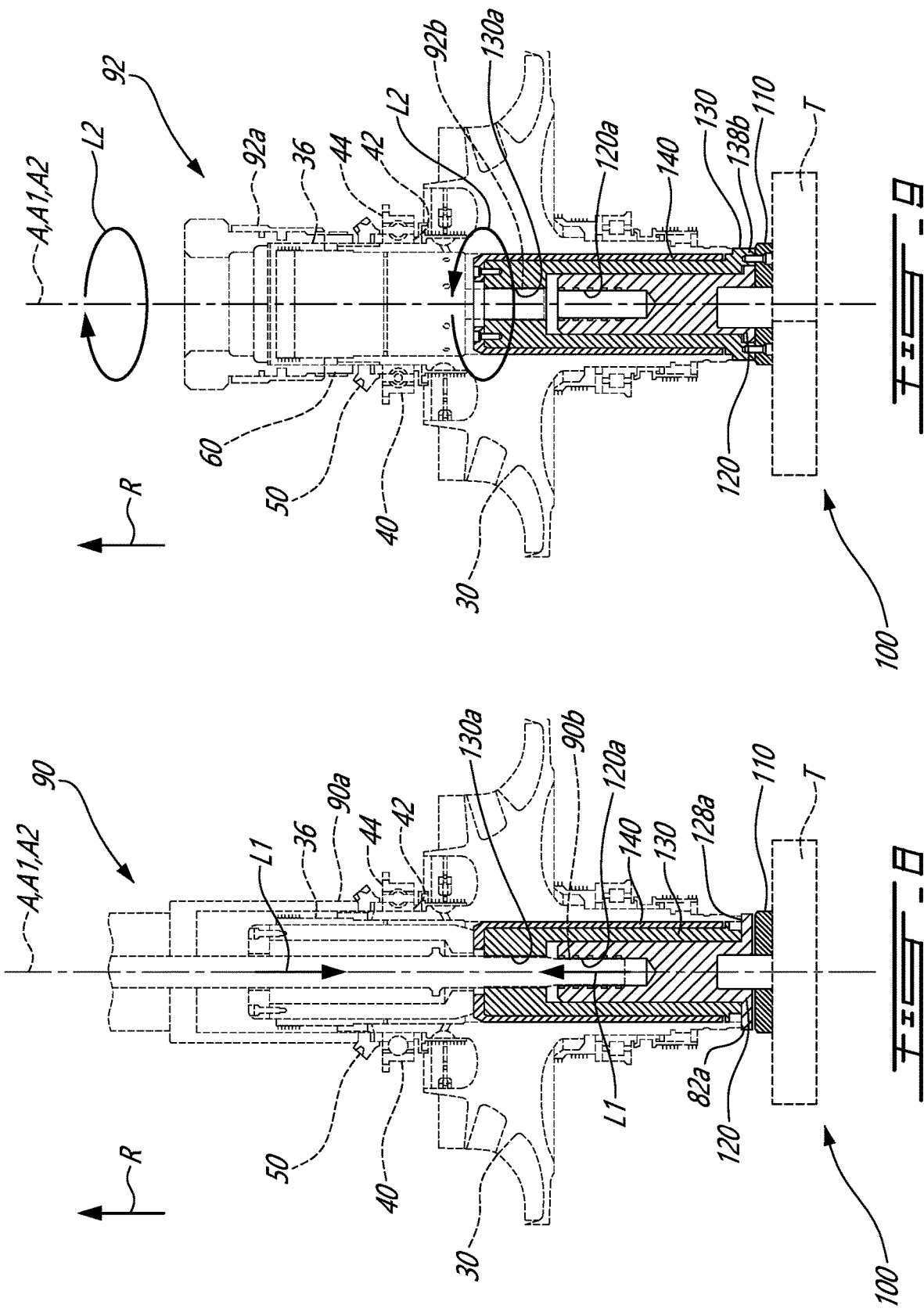

ROTOR LOADING SYSTEM

TECHNICAL FIELD

The application relates generally to rotors of aircraft turbine engines and, more particularly, to the assembly and disassembly of such rotors and tools for doing same.

BACKGROUND OF THE ART

Engines, such as turbine engines, have rotors that are rotatably mounted inside shrouds with relatively small clearances between the rotors and the shrouds. The assembly or disassembly of some rotors, whether during initial building of the engine or during maintenance, is a time-consuming and costly enterprise that entails the assembly or disassembly of neighboring components in order to make room for suitable handling of such rotors.

SUMMARY

In accordance with an aspect of the present technology, there is provided a rotor loading system for an aircraft turbine engine, the rotor loading system comprising: a first tool having opposite first proximal and first distal ends, the first proximal end defining a traction interface about a first axis connectable to a traction device and a first peripheral surface radially outward of the traction interface, the first distal end defining a plurality of first projections spaced circumferentially from one another about the first axis and extending to radially outward of the first peripheral surface; a second tool having opposite second proximal and second distal ends, the second proximal end defining a torque interface about a second axis connectable to a torque device and a second peripheral surface radially outward of the torque interface, the second distal end defining a plurality of second projections spaced circumferentially from one another about the second axis and extending to radially outward of the second peripheral surface; wherein a one of the first and the second tool is received by a remaining one of the first and the second tool such that: the first axis and the second axis are colinear; each one of the first projections is received between two consecutive second projections of the plurality of second projections.

In accordance with another aspect of the present technology, there is provided a rotor loading system for an aircraft turbine engine, the rotor loading system comprising: a first tool having opposite first proximal and first distal ends, the first proximal end defining a traction interface about a first axis connectable to a traction device and a first peripheral surface radially outward of the traction interface, the first distal end defining a plurality of first projections spaced circumferentially from one another about the first axis and extending to radially outward of the first peripheral surface; a second tool having opposite second proximal and second distal ends, the second proximal end defining a torque interface about a second axis connectable to a torque device and a second peripheral surface radially outward of the torque interface, the second distal end defining a plurality of second projections spaced circumferentially from one another about the second axis and extending to radially outward of the second peripheral surface, the second tool having a cavity extending inward the second distal end along the second axis, and a plurality of radial channels spaced circumferentially from one another about the second axis and extending radially outwardly from the cavity to between a pair of consecutive second projections, wherein the first proximal end is received into the cavity and each one of the first projections extends through a one of the channels to between two consecutive second projections of the plurality of second projections.

In accordance with yet another aspect of the present technology, there is provided a rotor loading system for an aircraft turbine engine, the rotor loading system comprising: a mounting base; a first tool having opposite first proximal and first distal ends, the first distal end proximate to the mounting base and defining a plurality of first projections spaced circumferentially from one another about a first axis, the first proximal end defining a traction interface about the first axis connectable to a traction device and a first peripheral surface located radially outward of the traction interface, the first projections extending to radially outward of the first peripheral surface; a second tool having opposite second proximal and second distal ends, the second distal end fastened to the mounting base and defining a plurality of second projections spaced circumferentially from one another about a second axis, the second proximal end defining a torque interface about the second axis connectable to a torque device and a second peripheral surface located radially outward of the torque interface, the second projections extending to radially outward of the second peripheral surface, the second tool having a cavity extending inward the second distal end along the second longitudinal axis, wherein the first proximal end is matingly received into the cavity such that the first axis and the second axis are collinear, and each one of the first projections is received between two consecutive second projections of the plurality of second projections.

DESCRIPTION OF THE DRAWINGS

Reference is now made to the accompanying figures in which:

FIG. 7 is a schematic elevation view of the aft portion of the rotor of FIG. 3 and a portion of the rotor loading system of FIG. 2;

FIG. 8 is a cross-sectional view of the rotor assembly of FIG. 2 shown mounted with the rotor loading system of FIG. 2 and a traction device, taken along line 8-8 of FIG. 6; and FIG. 9 is a cross-sectional view of the rotor assembly of FIG. 2 shown mounted with the rotor loading system of FIG. 2 and a torquing device, taken along line 9-9 of FIG. 6.

DETAILED DESCRIPTION

Figure 1:
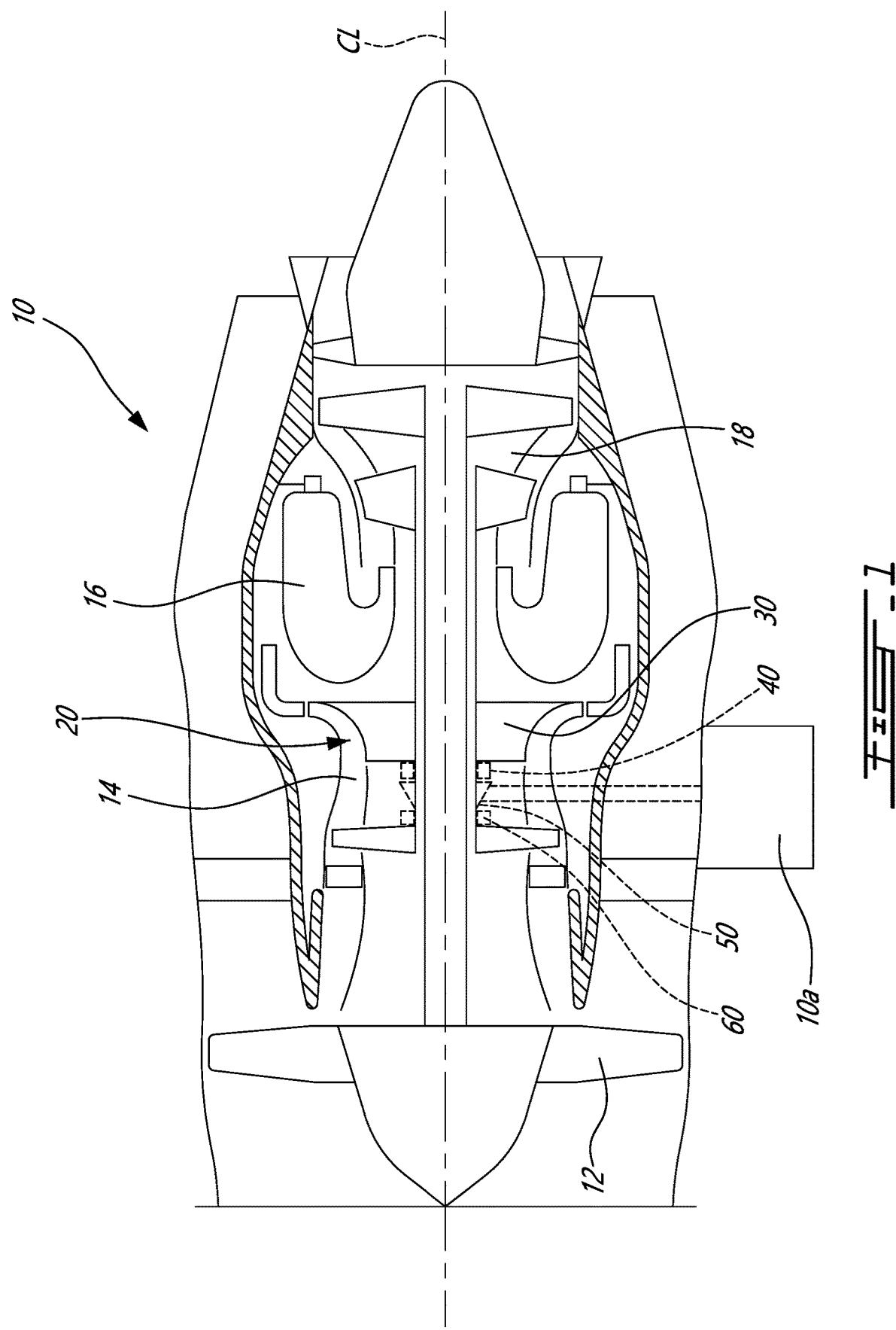
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A rotor assembly 20 is shown among rotary parts of the engine 10 rotatably disposed about an axis CL. The rotor assembly 20 includes a rotor 30 and a bearing 40 mounted thereto and holding the rotor 30 in alignment with the axis CL. Other rotary parts of the engine 10 are also provided for example in an accessory gearbox 10a of the engine 10. The present technology generally relates to systems for mounting a bearing to a rotor. Although the embodiments of the technology described herein are directed to some such systems adapted for mounting the bearing 40 to the rotor 30, i.e., a centrifugal compressor disc of the compressor section 14, other embodiments of the technology can be, mutatis mutandis, adapted for mounting another component to another one of the rotary parts of the engine 10. Some such rotary parts may be rotatable about the axis CL, such as turbine discs of the turbine section 18, whereas others may be rotatable about an axis remote from the axis CL, for example parts located in the accessory gearbox 10a.

Figure 2:
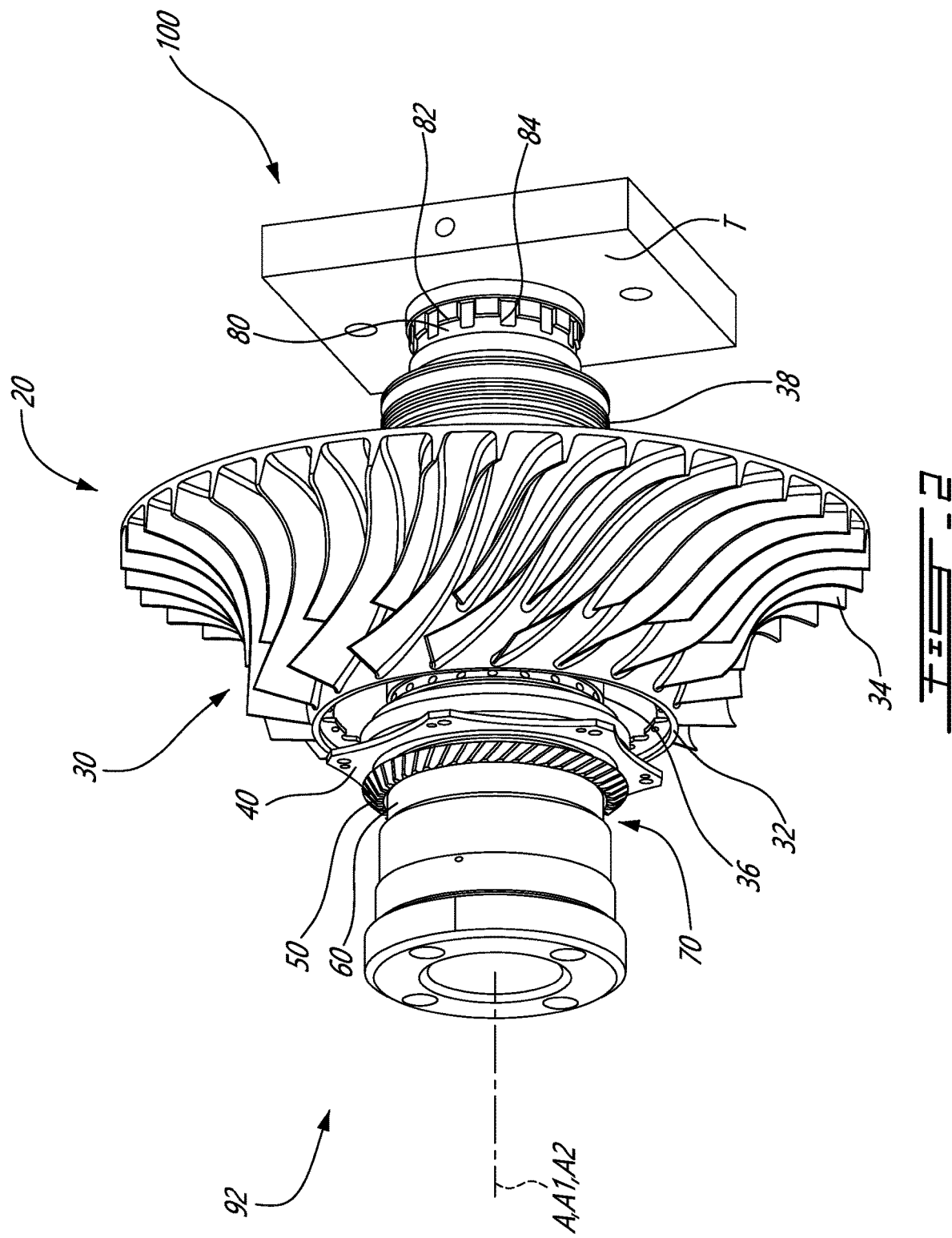
FIG. 2 is a perspective view of a rotor assembly mounted with a torquing device and a rotor loading system in accordance with an embodiment.
Figure 3:
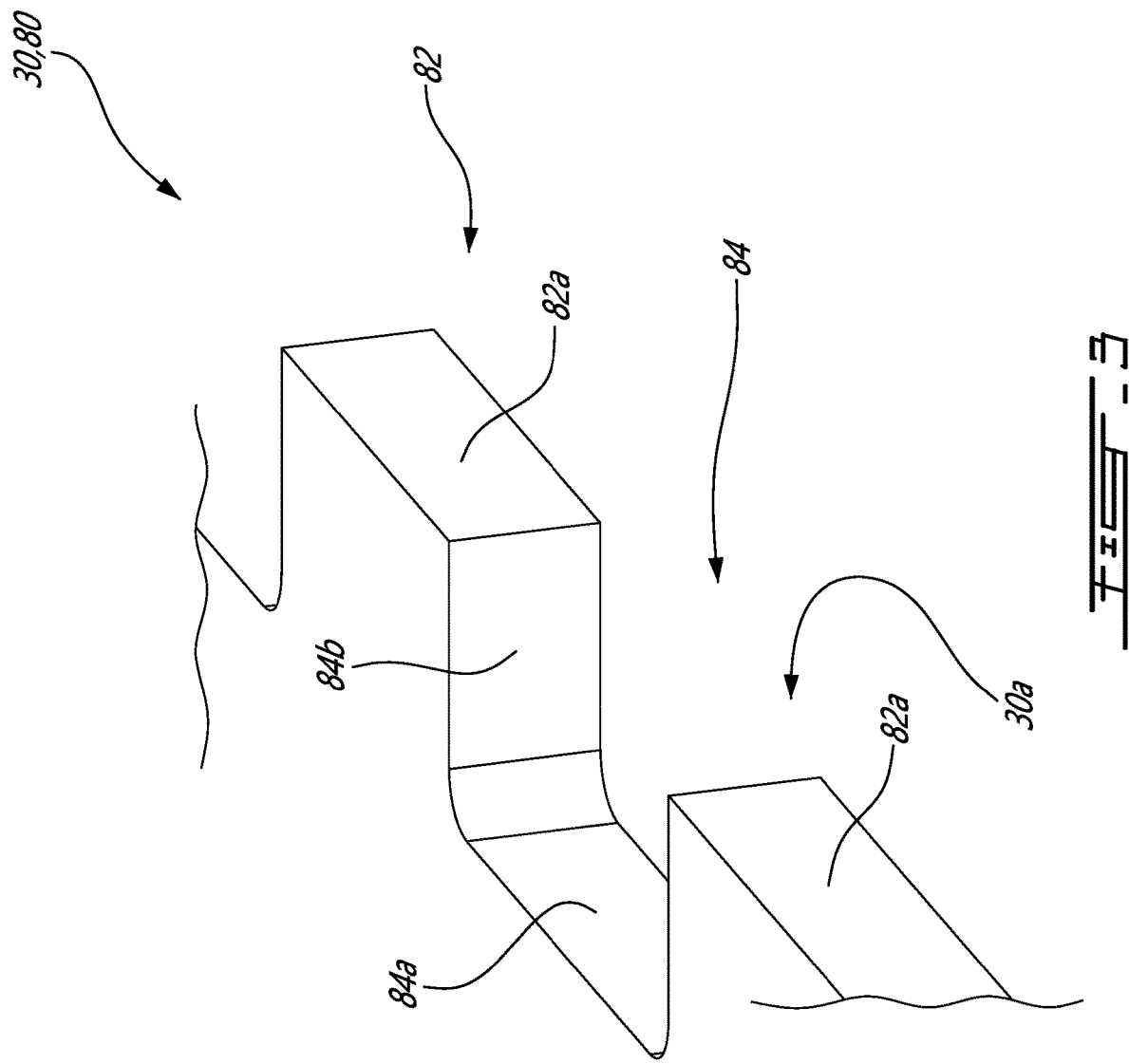
FIG. 3 is a schematic, perspective view of an aft portion of a rotor of the rotor assembly of FIG. 2.

Turning now to FIG. 2, the rotor assembly 20 is shown isolated from a remainder of the engine 10. The rotor 30 of the rotor assembly 20 includes a hub 32, an impeller 34 extending radially outwardly from the hub 32, and fore and aft hub extensions 36, 38 respectively extending axially from the hub 32 on either side of the impeller 34. It can be seen that the impeller 34 is semi-enclosed, i.e., is open on a fore side thereof and closed on an aft side thereof. The rotor assembly 20 also includes the bearing 40 as well as a gear 50 and a nut 60 which are disposed around the fore hub extension 36. The bearing 40 is disposed between the gear 50 and the hub 32 and the nut 60 is disposed next to the gear 50 opposite the bearing 40. An inner race 42 (FIGS. 8 and 9) of the bearing 40 is mounted to the fore hub extension 26. An outer race 44 (FIGS. 8 and 9) of the bearing 40 defines a bracket that is fastenable to a carcass of the engine 10 (not shown). As shown in FIG. 2, the rotor assembly 20 has opposite fore and aft ends 70, 80, in this case respectively defined by free ends of the fore and aft hub extensions 36, 38. The fore end 70 of the rotor assembly 20 is structured and arranged to be interchangeably operatively connectable to either one of an axial loading device (or traction device) 90 (FIG. 8) and a rotational loading device (or torquing device) 92 (FIG. 9). In FIG. 2, a portion of the torquing device 92 is shown operatively connected to the nut 60. The aft end 80 of the rotor assembly 20 is structured and arranged to be operatively connectable to a rotor loading system 100. As schematically shown in FIG. 3, the aft end 80 is an annular body defining an opening of a central bore 30a of the rotor 30 extending axially through the rotor 30. The aft end 80 has an annular, axial wall 82 in which circumferentially-spaced keyways 84 are defined. The keyways 84 are in this case radially-extending slots that communicate inwardly with the central bore 30a inside the rotor 30 and outwardly with outside the rotor 30. Stated otherwise, the keyways 84 extend radially from an innermost diameter of the axial wall 82 to an outermost diameter of the axial wall 82, although other shapes are contemplated. The keyways 84 each define an axially-oriented bottom surface 84a and a pair of circumferentially-oriented side surfaces 84b on either side of the bottom surface 84a. Portions of the axial wall 82 located adjacent to the keyways 84 may be referred to as axial surfaces 82a. As will be described in greater detail herein below, the rotor loading system 100 is cooperable with the traction device 90 or with the torquing device 92, respectively, to impart a rated axial (or compression) load L1 or a rated rotational (or torque) load L2 to the rotor assembly 20 to place the bearing 40 and the gear 50 into suitable mounted positions relative to the rotor 30. Thus, the axial surfaces 82a of the axial wall 82 and the side surfaces 84b of the keyways 84 are sized to be suitable for bearing the rated axial load L1 and the rated rotational load L2, respectively.

Figure 4:
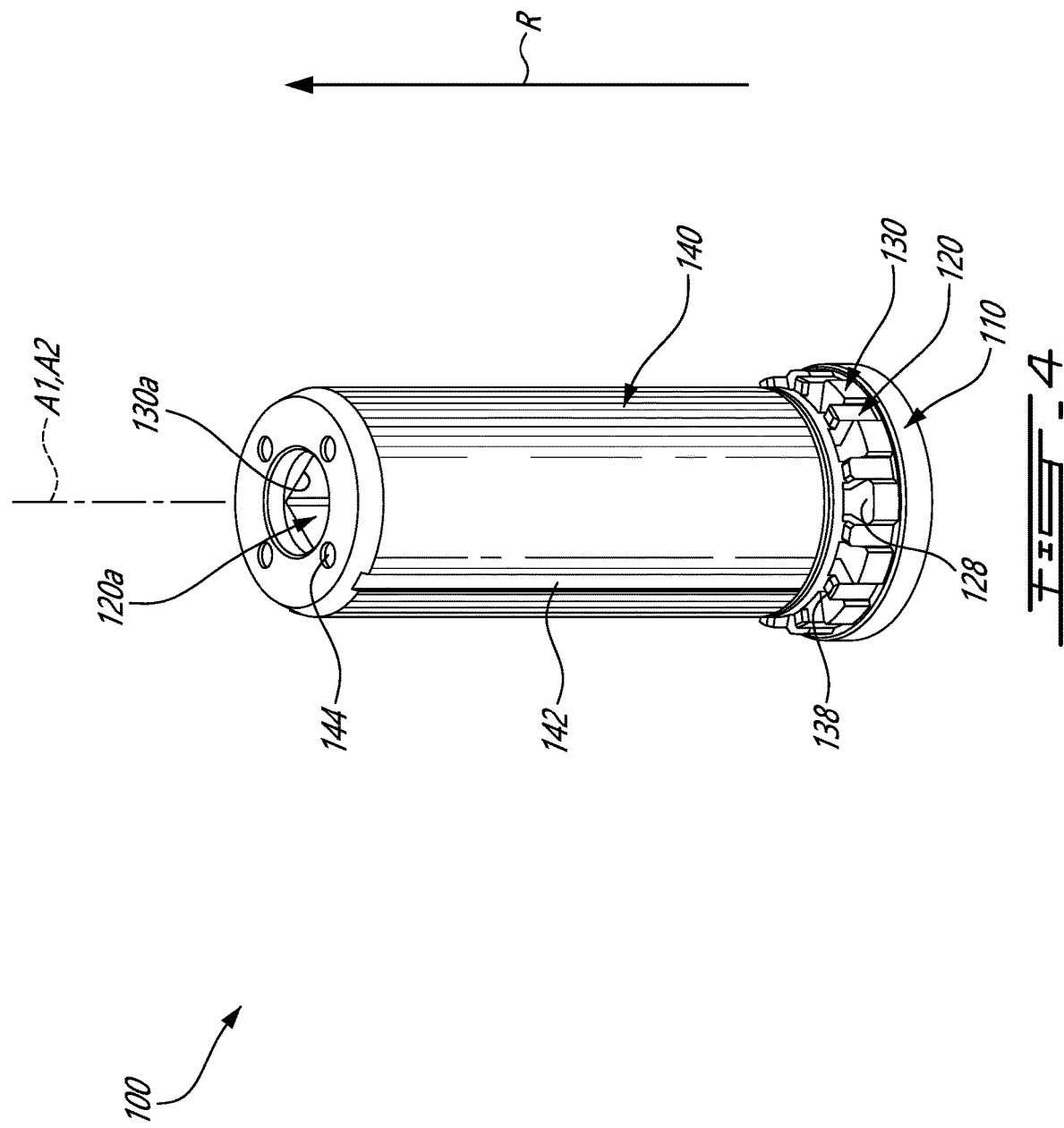
FIG. 4 is a perspective view of the rotor loading system of FIG. 2.
Figure 5:
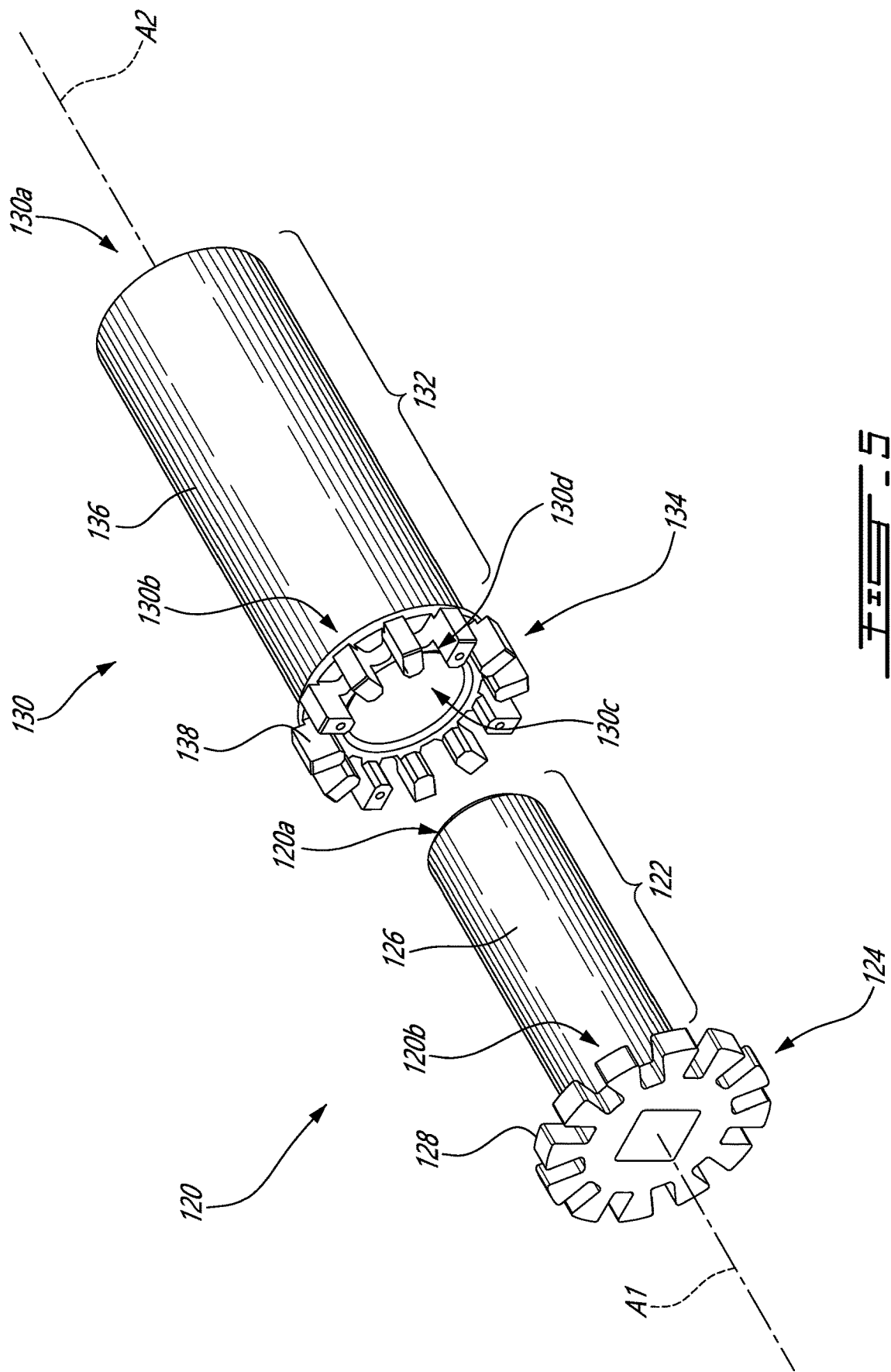
FIG. 5 is a perspective, exploded view of first and second tools of the rotor loading system of FIG. 2.
Figure 6:
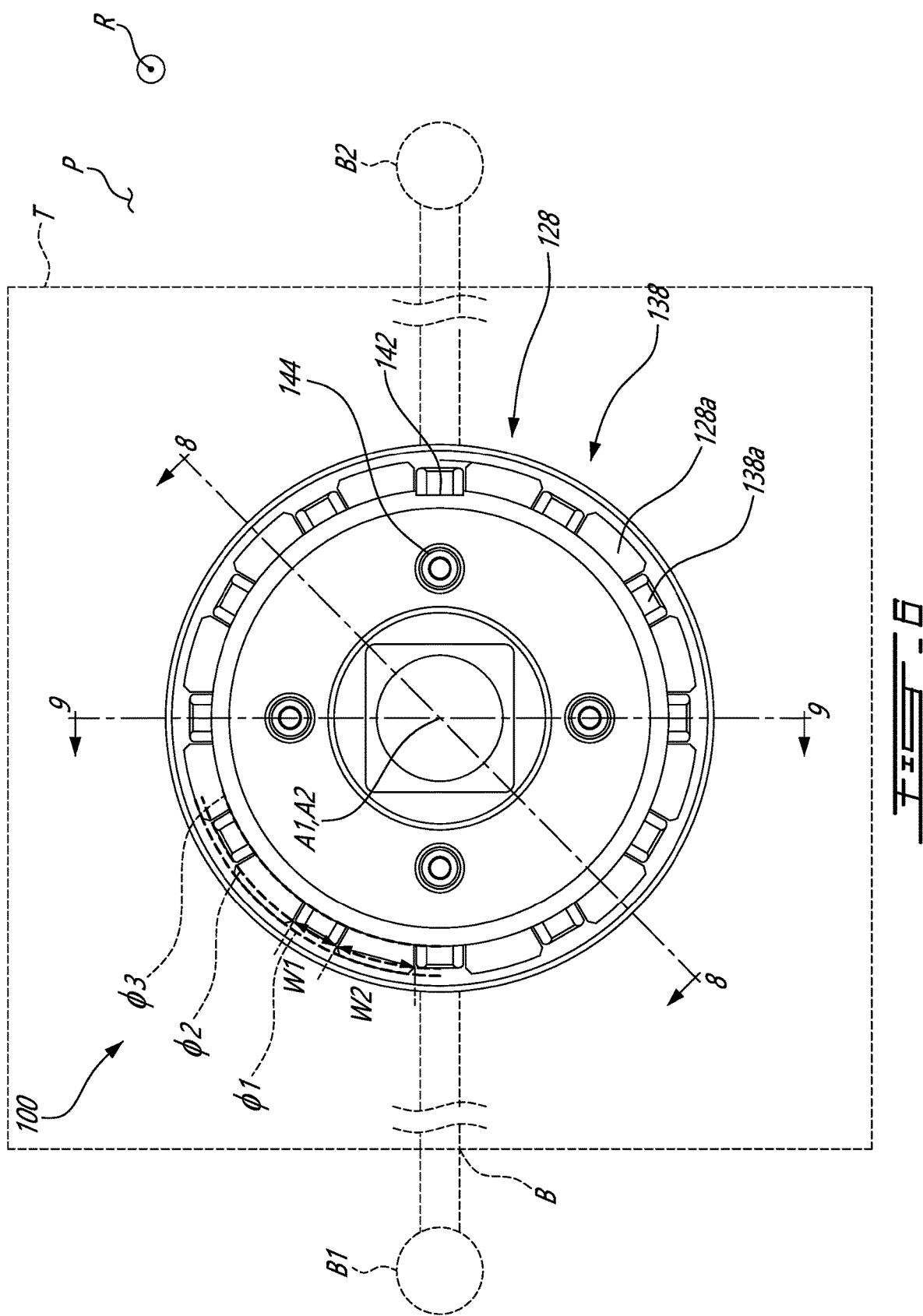
FIG. 6 is a top, planar view of the rotor loading system of FIG. 2.

With reference to FIGS. 4-6, the rotor loading system 100, referred to henceforth as the loading system 100, will now be described in greater detail. The loading system 100 generally includes a mounting base 110 adapted to support a remainder of the loading system 100, a first tool 120 having a traction interface 120a connectable to the traction device 90 (FIG. 8) and a first effector 120b (FIG. 5) for effecting a load imparted by the traction device 90 to the rotor assembly 20, and a second tool 130 having a torque interface 130a connectable to the torquing device 92 (FIG. 9) and a second effector 130b (FIG. 5) for effecting a load imparted by the torquing device 92 to the rotor assembly 20. The first and second tools 120, 130 are arranged to be simultaneously positionable relative to the rotor 30 such that the traction interface 120a and the torque interface 130a are both received inside the central bore 30a whereas the first and second effectors 120b, 130b are engageable with the aft end 80 of the rotor 30 via the axial wall 82 and the keyways 84, respectively.

Referring to FIG. 4, the mounting base 110 is a body arranged to be mounted to a supporting structure that is suitable for supporting the loading system 100 and the rotor assembly 20. For this purpose, a bottom side of the mounting base 110 defines a mounting interface to which a complementary interface of the supporting structure may latch on. In other embodiments, the mounting base 110 is instead arranged to be mounted to the supporting structure via fasteners. It is also contemplated that the mounting interface of the mounting base 110 may be at a location other than the bottom side, for example at one or more side walls of the mounting base 110. The supporting structure may be for instance a table T (FIG. 2) on which the rotor assembly 20 may be assembled, or a bridge B (FIG. 6) via which the engine 10 may be stripped of the rotor assembly 20 either in full or in part. A top side of the mounting base 110 opposite the bottom side defines a supporting interface onto which the first tool 120 and the second tool 130 may be positioned to be held via the mounting base 110 toward a reference direction R. In this position, the second tool 130 is connectable to the mounting base 110 so as to be held stationary relative thereto, whereas the first tool 120 has a range of motion M (FIG. 7) so as to be movable relative to the mounting base 110 in the reference direction R. The range of motion M may be confined by the second tool 130 in the reference direction R, and by the mounting base 110 in the direction opposite the reference direction R. In this embodiment, the mounting base 110 has a discoid shape and the top and bottom sides are flat, although other shapes are contemplated. It is contemplated that in some embodiments, the mounting base 110 and the second tool 130 may form an integral piece. Stated otherwise, the second tool 130 may be arranged to be mountable directly to the supporting structure, in which case the mounting base 110 may be omitted.

As best seen in FIG. 5, the first and second tools 120, 130 are elongated bodies respectively extending longitudinally about a first axis A1 and a second axis A2. The first tool 120 has a first proximal end 122 and an opposite first distal end 124 spaced from one another along the first axis A1. The first proximal end 122 defines the traction interface 120a about the first axis A1, and defines a first peripheral surface 126 radially outward of the traction interface 120a. The first distal end 124 defines the first effector 120b, i.e., a plurality of first projections 128 that are spaced circumferentially from one another about the first axis A1. The first projections 128 extend to radially outward of the first peripheral surface 126. The second tool 130 has a second proximal end 132 and an opposite second distal end 134 spaced from one another along the second axis A2. The second proximal end 132 defines the torquing interface 130a about the second axis A2, and defines a second peripheral surface 136 radially outward of the torquing interface 130a. The second distal end 134 defines the second effector 130b, i.e., a plurality of second projections 138 that are spaced circumferentially from one another about the second axis A2. The second projections 138 extend to radially outward of the second peripheral surface 136.

Depending on the embodiment, one of the first and second tools 120, 130 (i.e., an innermost tool) is receivable by a remaining one of the first and second tools 120, 130 (i.e., an outermost tool) such that the first and second axes A1, A2 are collinear, the first and the second proximal ends 122, 132 face toward a common direction, and each one of the first projections 128 is received between two consecutive second projections 138. When the first and second tools 120, 130 are supported by the mounting base 110, the common direction corresponds to the reference direction R.

In the depicted embodiment, the first tool 120 is receivable by the second tool 130. Hence, the first tool 120 is the innermost tool, and the second tool 130 is the outermost tool. The second tool 130 defines a cavity 130c that extends inward of the second distal end 134 and is sized for receiving the first proximal end 122. The cavity 130c has a peripheral wall shaped complementarily to a shape of the first peripheral surface 126. The shape of the first peripheral surface 126 is cylindrical, although other shapes are contemplated. The second tool 130 also defines a plurality of channels 130d spaced circumferentially from one another about the second axis A2. Each one of the channels 130d extends radially outwardly between a pair of consecutive second projections 138, from the cavity 130c to outside the second tool 130. Each one of the channels 130d is sized for receiving one of the first projections 128.

Also, in some embodiments, the loading system 100 further includes a protector sleeve 140 (best seen in FIG. 4) having an interior sized to receive the distal portion of the outermost tool, and an exterior sized to fit the central bore 30a. The protector sleeve 140 may thus act as a bushing for precisely aligning the loading system 100 with the axis A as it enters the central bore 30a. In such embodiments, the first and second projections 128, 138 respectively extend to radially outward of the protector sleeve 140. As shown in FIG. 6, the first projections 128 are circumscribed by a first diameter $\phi 1$. The second projections 138 are circumscribed by a second diameter $\phi 2$ which generally corresponds to an outer diameter of the aft portion 80 of the rotor 30 (FIG. 2). The protector sleeve 140 is circumscribed by a third diameter $\phi 3$ that corresponds to a diameter of the central bore 30a. The third diameter $\phi 3$ is smaller than either one of the first diameter $\phi 1$ and the second diameter $\phi 2$. Advantageously, the protector sleeve 140 may be constructed of a material suitable for mitigating damage otherwise caused to the rotor 30 should the loading system 100 contact the rotor 30. Some such materials include plastics and metals of a hardness that is less than that of the material of which the rotor 30 is constructed, among other possibilities. In some such embodiments, the protector sleeve 140 defines an indicator 142 arranged to be circumferentially aligned with one of the first projections 128 or one of the second projections 138. For instance, the protector sleeve 140 may be in a rotationally indexed position with respect to the second tool 130 about the second axis A2 so as to align with one of the second projections 138 (FIG. 4) or with one of the channels 130d. One or more fasteners 144 may be used to hold the protector sleeve 140 in the rotationally indexed position relative to the second tool 130. In other embodiments, the second proximal end 132 of the second tool 130 is sized to fit the central bore 30a. In some such embodiments, the protector sleeve 140 is a coating applied to the second proximal end 132. In other such embodiments, the protector sleeve 140 is omitted.

In FIG. 6, it can also be seen that in this embodiment, the first diameter $\phi 1$ is smaller than the second diameter $\phi 2$. Stated otherwise, the first projections 128 extend to radially outward of the second projections 138 and to radially outward of the aft end 80 of the rotor 30. A first circumferential width W1 of the first projections 128 corresponds to a circumferential width of the axial surfaces 82a, and a second circumferential width W2 of the second projections 138 corresponds to a circumferential width of the keyways 84. In this case, the first circumferential width W1 is greater than the second circumferential width W2. Conversely, the circumferential width of the axial surfaces 82a is greater than the circumferential width of the keyways 84, which favors the structural integrity of the rotor 30.

With reference to FIGS. 6 to 9, functional characteristics of the loading system 100 will now be described. In order to build the rotor assembly 20, the loading system 100 may be mounted to the table T via the mounting base 110 such that the reference direction R corresponds to an upward direction relative to a planar horizontal ground surface P. The rotor 30 may then be positioned above the loading system 100, with its aft end 80 facing down, such that its axis A generally coincides with the axes A1, A2 of the loading system 100. The rotor 30 may be rotated about the axis A into a position in which one of the keyways 84 axially aligns with the indicator 142. The rotor 30 may then be moved toward the table T such that its central bore 30a receives the proximal ends 122, 132 of the loading system 100 until the rotor 30 is in a seated position relative to the loading system 100. In the seated position (FIG. 7), the axes A1, A2 are collinear to the axis A. The bottom surfaces 84a of the keyways 84 abut the axial surfaces 138a of the second projections 138, whereas first axial surfaces 128a of the first projections 128 are free to move axially to and from the axial surfaces 82a of the axial wall 82. Indeed, the axial surfaces 82a do not bear against the first axial surfaces 128a of the first projections 128. The first projections 128 have a first axial height H1 that is smaller than a second axial height H2 of the second projections 138. Moreover, the keyways 84 have a depth (i.e., an axial distance between the axial surfaces 82a and the bottom surfaces 84a) that is less than a difference between the second axial height H2 and the first axial height H1. Hence, upon the rotor 30 being in the seated position, the first tool 120 is axially slidable relative to the second tool 130 between a first position and a second position. In the first position, the first axial surfaces 128a are offset relative to the second axial surfaces 138a by a first distance D1. In the second position, the first axial surfaces 128a are offset relative to the second axial surfaces 138a by a second distance D2 smaller than the first distance D1. In the first position, the first projections 128 do not contact the aft end 80 of the rotor 30, which could otherwise prevent the rotor 30 from being fully seated onto the second projections 138. The rotor 30 being fully seated allows to maximize an area of overlap between the side surfaces 84b of the keyways 84 and corresponding side surfaces 138b of the second projections 138, which may be referred to as a rotational loading area. In the second position, the first axial surfaces 128a abut the axial surfaces 82a, and an area of overlap therebetween may be referred to as an axial loading area. A difference between the first distance D1 and the second distance D2 corresponds to the range of motion M of the first tool 120. It should be noted that the cavity 130c and the channels 130d are sized such that the first tool 120 is slidable relative to the second tool 130 between the first position and the second position, i.e., across the range of motion M, unhindered. Moreover, the second tool 130 is arranged such that none of the surfaces defining either the cavity 130c or the channels 130d bear against the first tool 120 upon the first tool being in the second position. As such, any axial load exerted by the first tool 120 in the reference direction R onto the rotor 30 is fully borne by the axial surfaces 82a.

Turning now to FIG. 8, the loading system 100 is mounted to the table T. The rotor 30 is shown in the seated position and the bearing 40 and the gear 50 are disposed on the fore hub extension 36 albeit not securely so. A first traction member 90a of the traction device 90 surrounds the fore hub extension 36 and axially engages the gear 50 and the bearing 40 via the gear 50, whereas the nut 60 of FIG. 2 is absent. A second traction member 90b of the traction device 80 extends into the rotor 30 via the central bore 30a, through the torquing interface 130a and to the traction interface 120a. The second traction member 90b axially engages the traction interface 120a, holding the first tool 120 in the second position. In the depicted embodiment, the traction interface 120a is a threaded bore extending about the first axis A1 into the first tool 120 from the first proximal end 122 toward the first distal end 124. The second traction member 90b is a threaded rod shaped complementarily to the traction interface 120a. As the traction device 90 is operated, the second traction member 90b is translated relative to the first traction member 90a in the reference direction R while the first traction member 90a is held stationary, such that opposite, compressive forces are applied onto the rotor assembly 20, namely onto the gear 50 and the bearing 40 via the first traction member 90a and onto the axial surfaces 82a of the rotor 30 via the axial surfaces 128a of the first tool 128. Upon the rated axial load L1 being applied via the first traction member 90a, the gear 50 and the bearing 40 are deemed to be suitably positioned relative to the rotor 30.

In FIG. 9, the loading system 100 has remained mounted to the table T and the rotor 30 has remained in the seated position. The traction device 90 has been removed. The nut 60 has been threadedly engaged with the fore hub extension 36 so as to axially engage the gear 50 as well as the bearing 40 via the gear 50. A first torquing member 92a of the torquing device 92 is rotationally engaged with the nut 60. A second torquing member 92b of the torquing device 92 extends into the rotor 30 via the central bore 30a to the torquing interface 130a. The second torquing member 92b rotationally engages the torquing interface 130a such that one may not rotate about the second axis A2 without the other. In the depicted embodiment, the torquing interface 130a is a peripheral wall having an anti-rotational cross section. The anti-rotational cross section has a square shape, although other shapes are contemplated. The second torquing member 92b is an elongated body having a cross section shaped complementarily to that of the torquing interface 130a. It should be understood that the the torquing interface 130a and the second torquing member 92b described herein are merely one of various suitable anti-rotational assemblies. As the torquing device 92 is operated, the first torquing member 92a is rotated with the nut 60 about the second axis A2 relative to the second torquing member 92b, which is held stationary with the rotor 30. As a rotational load is applied to the nut 60 via the first torquing member 92a, an opposite rotational load is applied to the rotor 30 via the side surfaces 138b of the second tool 130. In this embodiment, as the first torquing member 92a is rotated counterclockwise as viewed in the reference direction R, the first torquing member 92a axially drives the nut 60 in the direction opposite to the reference direction R, such that the nut 60 axially loads the gear 50 as well as the bearing 40 via the gear 50. Upon the rated rotational load L2 being applied via the first torquing member 92a, the gear 50 and the bearing 40 are deemed to be suitably secured relative to the rotor 30.

Understandably, the steps described hereinabove can be performed in reverse to disassemble, or strip, the rotor assembly 20. Also, in order to strip the rotor assembly 20 from the engine 10, the loading system 100 may be mounted to the bridge B (FIG. 6) via the mounting base 110. With the rotor assembly 20 being installed in the engine 10, the axis A of the rotor 30 is collinear to the axis CL. The loading system 100 may thus be positioned with the bridge B aft of the rotor assembly 20 such that the axes A1, A2 coincide with the axes A, CL, with the loading system 100 extending away from the bridge B and toward the central bore 30a. The loading system 100 may then be moved toward the rotor 30 such that the central bore 30a receives the proximal ends 122, 132 of the loading system 100 until the rotor 30 is in the seated position relative to the loading system 100. In the seated position, opposite ends B1, B2 of the bridge B are located adjacent to mounting tabs of the carcass of the engine 10, and may be fastened thereto to hold the loading system 100 stationary relative to the carcass. The loading system 100 can thus be said to be suitable for guiding the bridge B relative to the carcass of the engine 10. With the rotor 30 in the seated position relative to the loading system 100 and the loading system 100 held stationary relative to the carcass via the bridge B, either of the traction device 90 and the torquing device 92 can be used to strip the rotor assembly 20 upon being suitably positioned on the fore side of the engine 10.

The embodiments described in this document provide non-limiting examples of possible toolations of the present technology. Upon review of the present disclosure, a person of ordinary skill in the art will recognize that changes may be made to the embodiments described herein without departing from the scope of the present technology. For example, a rotor loading system could be adapted for securing one or more components such as the bearing 40 and/or the gear 50 to a rotor other than a centrifugal compressor disc. The rotor loading system could be adapted for securing one or more components to either a fore or an aft side of the rotor. The rotor loading system could be adapted for applications other than securing a component to a rotor of an aircraft turbine engine, for example securing a component to a rotor of an industrial turbine engine, or even to a rotor of a surface (land or marine) vehicle turbine engine. The present technology could even be used in yet other applications such as securing a component to a rotor of an automotive powertrain based on either an internal combustion engine or an electric motor. Yet further modifications could be tooled by a person of ordinary skill in the art in view of the present disclosure, which modifications would be within the scope of the present technology.

The invention claimed is:

1. A rotor loading system for an aircraft turbine engine, the rotor loading system comprising:

a first tool having opposite first proximal and first distal ends, the first proximal end defining a traction interface about a first axis connectable to a traction device and a first peripheral surface radially outward of the traction interface, the first distal end defining a plurality of first projections spaced circumferentially from one another about the first axis and extending to radially outward of the first peripheral surface;

a second tool having opposite second proximal and second distal ends, the second proximal end defining a torque interface about a second axis connectable to a torque device and a second peripheral surface radially outward of the torque interface, the second distal end defining a plurality of second projections spaced circumferentially from one another about the second axis and extending to radially outward of the second peripheral surface;

wherein a one of the first and the second tool is received by a remaining one of the first and the second tool such that:

the first axis and the second axis are colinear;

each one of the first projections is received between two consecutive second projections of the plurality of second projections.

2. The rotor loading system of claim 1, wherein the one of the first and the second tool is the first tool, the second tool defining a cavity extending inward of the second distal end sized for receiving the first proximal end, and a plurality of radial channels spaced circumferentially from one another about the second axis, each one of the channels extending radially outwardly from the cavity to between a pair of consecutive second projections and sized for receiving a one of the first projections.

3. The rotor loading system of claim 2, wherein the first projections and the second projections respectively have a first axial surface and a second axial surface facing toward the common direction, and the cavity and the channels are sized such that the first tool is axially slidable relative to the second tool between a first position in which the first axial surface is axially offset relative to the second axial surface by a first distance, and a second position in which the first axial surface is axially offset relative to the second axial surface by a second distance smaller than the first distance.

4. The rotor loading system of claim 1, further comprising a protector sleeve surrounding a corresponding one of the first proximal end and the second proximal end of the remaining one of the first and the second tool, the first and the second projections extending to radially outward of the protector sleeve.

5. The rotor loading system of claim 4, wherein the protector sleeve defines an indicator circumferentially aligned with a one of the first projections or a one of the second projections.

6. The rotor loading system of claim 1, wherein a first axial height of the first projections is smaller than a second axial height of the second projections.

7. The rotor loading system of claim 1, wherein a first circumferential width of the first projections is greater than a second circumferential width of the second projections.

8. A rotor loading system for an aircraft turbine engine, the rotor loading system comprising:

a first tool having opposite first proximal and first distal ends, the first proximal end defining a traction interface about a first axis connectable to a traction device and a first peripheral surface radially outward of the traction interface, the first distal end defining a plurality of first projections spaced circumferentially from one another about the first axis and extending to radially outward of the first peripheral surface;

a second tool having opposite second proximal and second distal ends, the second proximal end defining a torque interface about a second axis connectable to a torque device and a second peripheral surface radially outward of the torque interface, the second distal end defining a plurality of second projections spaced circumferentially from one another about the second axis and extending to radially outward of the second peripheral surface, the second tool having a cavity extending inward the second distal end along the second axis, and a plurality of radial channels spaced circumferentially from one another about the second axis and extending radially outwardly from the cavity to between a pair of consecutive second projections, wherein the first proximal end is received into the cavity and each one of the first projections extends through a one of the channels to between two consecutive second projections of the plurality of second projections.

9. The rotor loading system of claim 8, wherein the first projections and the second projections respectively have a first axial surface and a second axial surface, and the cavity and the channels are sized such that the first tool is axially slidable relative to the second tool between a first position in which the first axial surface is axially offset relative to the second axial surface by a first distance, and a second position in which the first axial surface is axially offset relative to the second axial surface by a second distance smaller than the first distance.

10. The rotor loading system of claim 8, further comprising a protector sleeve surrounding the second proximal end, the first and the second projections extending to radially outward of the protector sleeve.

11. The rotor loading system of claim 10, wherein the protector sleeve defines an indicator circumferentially aligned with a one of the first projections or a one of the second projections.

12. The rotor loading system of claim 8, wherein a first axial height of the first projections is smaller than a second axial height of the second projections.

13. The rotor loading system of claim 8, wherein a first circumferential width of the first projections is greater than a second circumferential width of the second projections.

14. A rotor loading system for an aircraft turbine engine, the rotor loading system comprising:

a mounting base;

a first tool having opposite first proximal and first distal ends, the first distal end proximate to the mounting base and defining a plurality of first projections spaced circumferentially from one another about a first axis, the first proximal end defining a traction interface about the first axis connectable to a traction device and a first peripheral surface located radially outward of the traction interface, the first projections extending to radially outward of the first peripheral surface;

a second tool having opposite second proximal and second distal ends, the second distal end fastened to the mounting base and defining a plurality of second projections spaced circumferentially from one another about a second axis, the second proximal end defining a torque interface about the second axis connectable to a torque device and a second peripheral surface located radially outward of the torque interface, the second projections extending to radially outward of the second peripheral surface, the second tool having a cavity extending inward the second distal end along the second longitudinal axis, wherein the first proximal end is matingly received into the cavity such that the first axis and the second axis are collinear, and each one of the first projections is received between two consecutive second projections of the plurality of second projections.

15. The rotor loading system of claim 14, wherein the first projections and the second projections respectively have a first axial surface and a second axial surface facing away from the mounting base, and the cavity and the channels are sized such that the first tool is axially slidable relative to the second tool between a first position in which the first axial surface is axially offset relative to the second axial surface by a first distance, and a second position in which the first axial surface is axially offset relative to the second axial surface by a second distance smaller than the first distance.

16. The rotor loading system of claim 14, further comprising a protector sleeve surrounding the second proximal end, the first and the second projections extending to radially outward of the protector sleeve.

17. The rotor loading system of claim 16, wherein the protector sleeve defines an indicator circumferentially aligned with a one of the first projections or a one of the second projections.

18. The rotor loading system of claim 14, wherein a first axial height of the first projections is smaller than a second axial height of the second projections.

19. The rotor loading system of claim 14, wherein a first circumferential width of the first projections is greater than a second circumferential width of the second projections.

20. The rotor loading system of claim 14, wherein the mounting base is interchangeably mountable to either one of an engine building table and an engine partial strip bridge.

* * * * *